United States Patent
Sparks et al.

(10) Patent No.: US 7,187,865 B2
(45) Date of Patent: Mar. 6, 2007

(54) HYBRID PHOTONIC/ELECTRONIC SWITCHING IN A MULTI-CHANNEL NETWORK

(75) Inventors: Adrian P Sparks, Ongar (GB); Alan T. R. Briggs, Cambridge (GB); Frederick J Lalonde, Ottawa (CA); H. D. Wade Macleod, Carp (CA); Douglas W Fisher, Brampton (CA)

(73) Assignee: Nortel Networks Limited, Montreal (CA)

( * ) Notice: Subject to any disclaimer, the term of this patent is extended or adjusted under 35 U.S.C. 154(b) by 632 days.

(21) Appl. No.: 09/987,164

(22) Filed: Nov. 13, 2001

(65) Prior Publication Data

US 2003/0090758 A1    May 15, 2003

(51) Int. Cl.
*H04J 14/00* (2006.01)
(52) U.S. Cl. .............................. 398/46; 398/47; 398/51; 398/54
(58) Field of Classification Search ................. 398/46, 398/47, 51, 54
See application file for complete search history.

(56) References Cited

U.S. PATENT DOCUMENTS

| | | | |
|---|---|---|---|
| 5,069,521 A | 12/1991 | Hardwick | |
| 5,414,819 A | 5/1995 | Redmond et al. | |
| 5,777,761 A | 7/1998 | Fee | |
| 5,914,798 A * | 6/1999 | Liu | 398/7 |
| 6,046,833 A | 4/2000 | Sharma et al. | |
| 6,072,610 A * | 6/2000 | Kuroyanagi et al. | 398/5 |
| 6,075,630 A | 6/2000 | Nishio | |
| 6,108,113 A * | 8/2000 | Fee | 398/16 |
| 6,246,707 B1 * | 6/2001 | Yin et al. | 372/25 |
| 6,771,849 B1 * | 8/2004 | Fang et al. | 385/16 |

FOREIGN PATENT DOCUMENTS

| | | |
|---|---|---|
| CA | 2275606 | 7/1998 |
| EP | 0 620 694 A2 | 4/1994 |
| EP | 0 620 694 A3 | 4/1994 |
| EP | 1 091 614 A2 | 10/2000 |
| EP | 1 091 614 A3 | 10/2000 |

OTHER PUBLICATIONS

J. Armitage, et al., "Design of a Survivable WDM Photonic Network", 0-8186-7780-5/97 $10.00 1997 IEEE, 9 pages.

* cited by examiner

*Primary Examiner*—Dalzid Singh
(74) *Attorney, Agent, or Firm*—Pearne & Gordon LLP

(57) ABSTRACT

A system for hybrid electronic/photonic switching of traffic in a node of a communications network includes a plurality of interfaces; an electronic cross-connect (EXC); and a photonic cross-connect (PXC). Each interface is designed to translate a respective traffic stream between corresponding electronic and optical signals. The EXC selectively maps an electronic signal through a selected one of the interfaces, and the PXC selectively couples an optical signal between the selected interface and a selected one of at least two optical channels of the communications network.

15 Claims, 2 Drawing Sheets

HYBRID PHOTONIC/ELECTRONIC SWITCHING IN A MULTI-CHANNEL NETWORK

CROSS-REFERENCE TO RELATED APPLICATIONS

This is the first application filed for the present invention.

MICROFICHE APPENDIX

Not Applicable.

TECHNICAL FIELD

The present invention relates to switching of traffic in a communications network, and in particular to hybrid photonic/electronic switching in a multi-channel communications network.

BACKGROUND OF THE INVENTION

In the modern communications space, data communications networks are normally deployed on a physical layer network infrastructure constructed using network nodes interconnected by high-speed (frequently optical) data communications links. In many cases, the nodes and links are arranged in comparatively simple ring architectures, such as Bi-directional Line Switched Rings (BLSRs). However, data communications networks are rapidly evolving toward more complex topologies, such as multiple highly interconnected rings, and/or mesh networks. With any network topology, reliability is primarily a product of resource redundancy and rapid physical fault detection and signal switching to avoid failed network resources.

Resource redundancy refers to communications bandwidth capacity and equipment that is held in a dormant (i.e., unused) state during normal operations of the network, so that it is available to carry traffic in the event of a network resource failure. In BLSR networks, a 1:1 ratio is typically maintained between redundant (usually referred to as "protection") and working capacity. In mesh networks, the ratio between protection and working capacity is frequently 1:N, where N>1. In all cases, at least some redundant bandwidth capacity is maintained for each link, so that upon detection of a network resource failure affecting a working channel of that link, traffic can be switched onto the redundant capacity to bypass the failed resource.

Resource failure detection and switching of traffic into redundant resources (commonly referred to as "protection switching") can normally be performed by any node of the network, and thus can occur in the nodes immediately adjacent the failed resource. Typically, protection switching is accomplished using either the switch core of the node, and/or special purpose switch elements external to the switch core. An example of the latter arrangement is described in Canadian Patent Application No. 2,275,606, entitled "Automatic Protection Switching System in a Network", which was filed by Ellinas et al. on Dec. 20, 1996 and published on Jul. 2, 1998.

In all cases, the protection switching function operates to route traffic into a protection channel upon detection of any resource failure affecting normal traffic flow through a link or path. Normally, no distinction is made concerning which resource has failed. Thus, for example, the protection switching function is normally the same, whether the failed resource is a fiber span between two nodes, or an Optical-to-Electrical/Electrical-to-Optical (OEO) interface traversed by a traffic stream within one of the involved nodes.

This arrangement suffers the limitation that the probabilities of failure of the various components forming a link (and in particular OEO interfaces and optical fiber) can vary markedly. In particular, optical fiber tends to have a higher probability of failure (due to accidental fiber cuts) than an OEO interface, which is enclosed within the controlled environment of a node. Accordingly, based on their respective different probabilities of failure, an optimum network architecture would include respective different ratios of working to redundant resources for fiber and interfaces. However, in practice, each channel within a fiber must be hosted by a respective interface. Accordingly, redundant interfaces must necessarily be provisioned in the same ratio as redundant channels within a link. This typically results in greater numbers of redundant interfaces than is optimum, based on the probability of failure of each interface. This, in turn, tends to increase the size and cost of provisioning a network node having a desired working bandwidth capacity. The cost of provisioning the required number of interfaces typically constitutes the single largest component of the capital cost of deploying a modern fiber communications network.

Accordingly, a system that reduces the cost of a fiber communications network by enabling optimized provisioning of redundant resources remains highly desirable.

SUMMARY OF THE INVENTION

An object of the present invention is to provide a system that enables optimized provisioning of redundant resources in a network node of a multi-channel communications network.

Accordingly, an aspect of the present invention provides a system for hybrid electronic/photonic switching of traffic in a node of a communications network. The system comprises: a plurality of interfaces; an electronic cross-connect (EXC); and a photonic cross-connect (PXC). Each interface is designed to translate a respective traffic stream between corresponding electronic and optical signals. The EXC selectively maps an electronic signal through a selected one of the interfaces, and the PXC selectively couples an optical signal between the selected interface and a selected one of at least two optical channels of the communications network.

In preferred embodiments, the plurality of interfaces includes at least two working interfaces and at least one protection interface. The number of working interfaces may be based on a number of working channels of the communications network, while the number of protection interfaces can be selected based on a probability of failure of a working interface.

Each working interface may be designed to translate between an electronic signal and a corresponding optical signal having a substantially fixed predetermined wavelength. The predetermined wavelength may be determined (e.g., during provisioning of the interface in accordance with a design of the communications network) to correspond with a channel wavelength of at least one working channel of the network. In such cases, the working interface may include a narrow-band laser designed to generate an optical signal having the predetermined wavelength.

Each protection interface may be designed to translate between an electronic signal and a corresponding optical signal having a selected wavelength, which can be dynamically selected from a set of channel wavelengths of the network. In such cases, each protection interface may include either one or both of: a wide-band optical detector adapted to detect an optical signal having a wavelength corresponding to any channel wavelength of the network; and a tunable laser adapted to generate an optical signal having the selected wavelength.

A controller may be provided to implement coordinated control of the plurality of interfaces, the EXC and the PXC. This arrangement enables the system to perform protection switching due to failure of network optical channels independently of protection switching due to failure of a working interface.

Thus the controller may include means for detecting a failure of a working interface. In response to detection of the interface failure, the controller selects a protection interface for carrying the respective traffic stream of the failed interface. The EXC is then controlled to re-map the respective electronic signal of the affected traffic stream through the selected protection port. Simultaneously, the PXC is controlled to couple the respective optical signal of the traffic stream between the selected protection port and a respective optical channel through which the traffic stream is being conveyed. Where the affected traffic stream is outbound (that is, where the traffic stream is being converted from electronic to optical signal format) the selected protection port can be tuned to generate the outbound optical signal with a wavelength corresponding to that of the failed working interface. As a result, the traffic stream is re-routed within the hybrid photonic/electrical switching system to bypass the failed working interface, without altering traffic flows within the communications network itself.

The controller may also include means for detecting a failure of a working channel of the communications network. In response to the detected failure, the controller may determine an alternate optical channel through which a traffic stream affected by the channel failure can be carried. The PXC can then be controlled to couple the respective optical signal of the traffic stream between the working interface and the selected alternate optical channel. As a result, the traffic stream is re-routed within the network to avoid the failed optical channel, without affecting traffic flows through the EXC.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a system that enables optimized provisioning of OEO interfaces in a network node, by implementing hybrid photonic/electrical switching of traffic. For the purposes of describing the present invention, conventional traffic switching in a typical network node is first described with reference to FIG. 1. This description of prior art traffic switching is then followed by a description of hybrid photonic/electrical traffic switching in accordance with the present invention, with reference to FIG. 2.

Figure 1:
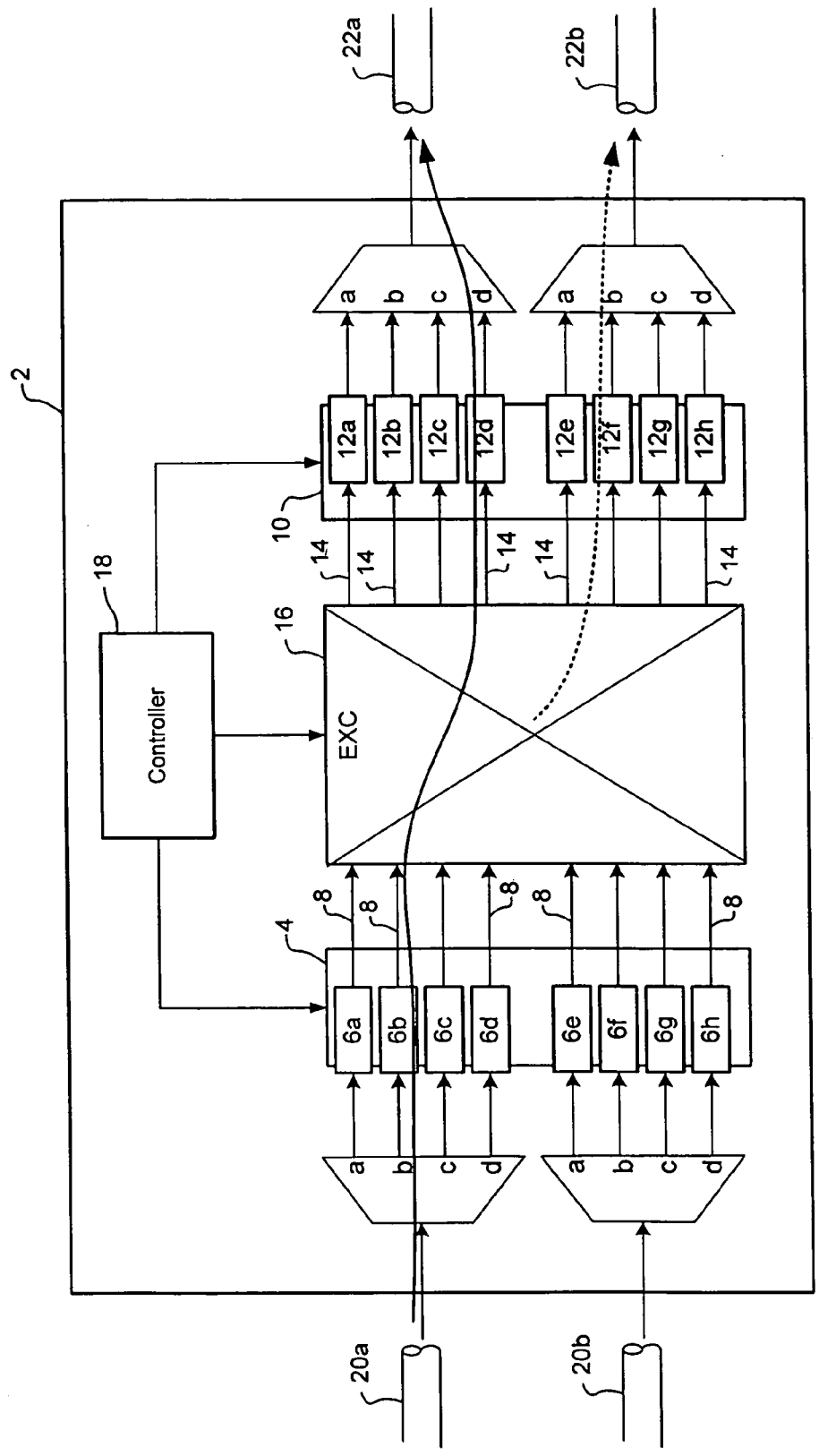
FIG. 1 is a block diagram schematically illustrating principle elements and operation of a conventional network node deployed in a communications network.

As shown in FIG. 1, a conventional network node 2 comprises an input interface 4 including a plurality of input ports 6 for receiving incoming traffic through respective input channels 8 of the network; an output interface 10 including a plurality of output ports 12 for launching outgoing traffic into respective output channels 14 of the network; an electronic cross-connect (EXC) 16 designed to map electronic signal traffic received through each one of the input ports 6 to any one of the output ports 12; and a controller 18 for controlling operation of the node 2. Typically, two or more channels 8, 14 are multiplexed within a single fiber of the network. In the node illustrated in FIG. 1, four input channels 8 are multiplexed within each of two respective input fibers 20. Similarly, four output channels 14 are multiplexed within each of two respective output fibers 22. Of course, it will be appreciated that more or fewer channels can be multiplexed within a fiber, as is well known in the art. It will also be appreciated that more than two input and output fibers 20, 22 may be coupled to the node 2.

Those skilled in the art will recognize that the block diagram of FIG. 1 presents an "unfolded" illustration of the node, which simplifies description of functional characteristics of the node. In practice, an actual network node of the type illustrated in FIG. 1 will normally be constructed using a folded architecture, in which pairs of input and output ports are mounted together on one or more input/output (I/O) cards. Each I/O card is coupled to the EXC, which operates as a switching backplane to map traffic between appropriate ones of the I/O cards.

As is well known in the art, each of the channels within any one fiber has a respective channel wavelength, which enables the various input channels 8 to be optically demultiplexed from their respective input fiber 20, and supplied to a respective one of the input ports 6. A conventional Optical-to-Electrical (OE) interface (not shown) within each input port 6 then converts optical signal traffic within a respective channel 8 into corresponding electrical signals for mapping through the EXC 16. As may be seen in FIG. 1, because channels 8 are independently demultiplexed from each fiber 20, overlapping sets of channel wavelengths can be used in each upstream fiber 20.

On the output side of the EXC 16, each output port 12 includes a conventional Electrical-to-Optical (EO) interface (not shown), which converts an outgoing electrical signal into a corresponding optical signal. The optical signal generated by each EO interface has a wavelength that corresponds to the channel wavelength of the respective output channel 14. Multiple (in this case four) output channels 14, each having a respective different channel wavelength, are then optically multiplexed into an output fiber 22 in a manner known in the art. As may be seen in FIG. 1, because channels are independently multiplexed into each output fiber 22, overlapping sets of channel frequencies can be used in the output fibers 22.

Using this arrangement, a traffic stream 24 received by the node 2 through an input fiber 20 can be mapped through the node 2 to a selected output fiber 22 in a conventional manner. Thus, in the example of FIG. 1 the traffic stream 24 is optically demultiplexed from the input fiber 20a and supplied to input port 6b. The input port 6b converts the traffic stream 24 into a corresponding electronic signal, which is then mapped through the EXC 16 to an available output port 12d coupled to the selected output fiber 22a. The output port 12d then converts the electronic signal into a corresponding optical signal, which is launched into output channel 14d hosted by the output port 12d.

In general, port assignments are arbitrary. Accordingly, the respective input and output channels 8, 14 used to convey the traffic stream 24 may have the same, or different channel wavelengths. Furthermore, working and protection channels of the network can be accommodated by any of the input and output ports 6, 12 of the node 2, without significantly affecting switching performance. However, as may be seen in FIG. 1, ports (and their associated OEO interfaces) must be provided on a one-for-one basis for each channel. Accordingly, for all practical purposes, "working" and "protection" ports (and OEO interfaces) are necessarily allocated in the same ratio as working and protection channels, in spite of the fact that the probability of failure of any one port (or OEO interface) is significantly less that that of a fiber link.

Figure 2:
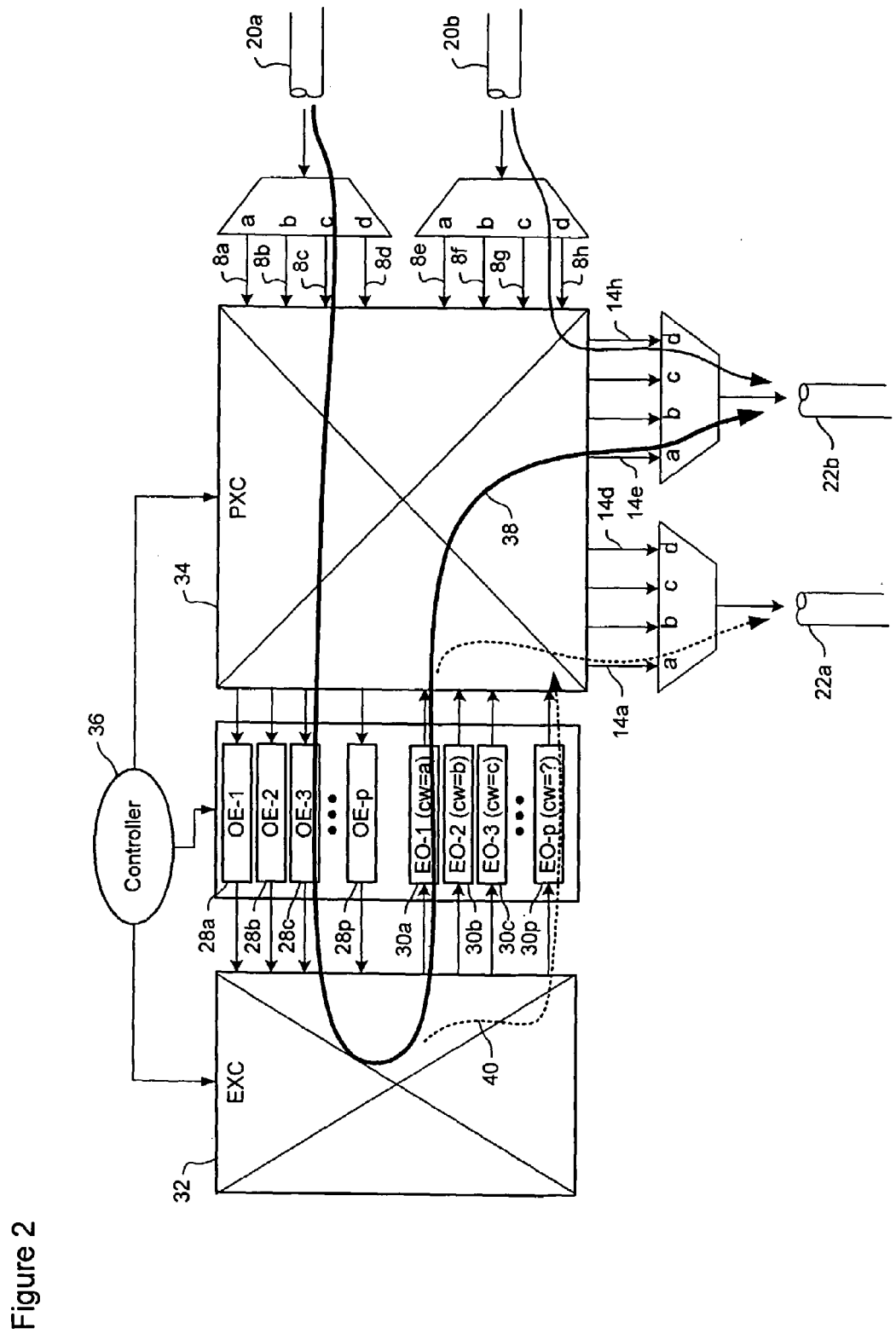
FIG. 2 is a block diagram schematically illustrating principle elements and operation of a network node in accordance with an embodiment of the present invention.

The present invention enables optimized provisioning of network resources, by providing a hybrid photonic/electronic switching system in which working and protection OEO interfaces can be allocated independently of working and protection channels. FIG. 2 is a block diagram schematically illustrating principle elements and operation of a network node in accordance with an embodiment of the present invention.

In general, the hybrid photonic/electronic switching system 26 of the present invention comprises a plurality of OEO interfaces 28, 30 for translating respective traffic streams between an electronic signal and an optical signal having a selected channel wavelength; an electronic cross-connect (EXC) 32 for mapping the electronic signal through the interface; and a photonic cross-connect (PXC) 34 for coupling the optical signal between the interface and a selected channel of the network. A control system 36 comprising any suitable combination of hardware and/or software can be provided for controlling operation of the interfaces 28, 30, EXC 32 and PXC 34. This arrangement can be implemented for either (or both) inbound or outbound traffic streams as desired. In the embodiment of FIG. 2, hybrid photonic/electronic switching in accordance with the present invention is implemented for both inbound and outbound traffic.

As in the prior art node illustrated in FIG. 1, input and output interfaces 28 and 30 are shown separately in order to facilitate description of the operation of the system 26. In practice, the interfaces 28 and 30 will normally be provided in pairs, with one or more pairs provisioned on a common I/O card. In addition, the embodiment of FIG. 2, interface protection resources are provisioned on a "per interface" basis. However, it will be appreciated, however that the methods of the present invention can equally be used to provide protection on a "per I/O card" basis, if desired.

On the input side of the EXC 32, a plurality of Optical/electronic (OE) interfaces 28 are provided for converting respective inbound optical signals into corresponding electronic signals for mapping through the EXC 32. Thus, for example, an inbound traffic stream 38 received by the system 26 through upstream channel 8c of input fiber 20a is coupled by the PXC 34 to OE interface OE-3 28c. Typically, an OE interface includes a broadband optical detector capable of detecting optical signals having any channel wavelength. In these circumstances, the PXC 34 can couple the inbound optical signals from channel 8c of input fiber 20a to any arbitrary one of the plurality of OE interfaces 28. Accordingly, the control system 36 can select one of the OE interfaces 28 during set-up of the communications path 38, and then control the PXC 34 to couple the selected OE interface (in this case OE-3 28c) to an appropriate one of the input channels (in this case channel 8c of fiber 20a).

Optimized provisioning of input-side resources of the system 26 can be accomplished by suitably selecting the number of OE interfaces 28. In particular, a number of "working" OE interfaces can be provided based on the number of upstream working channels, and one or more "protection" OE interfaces provided based on a probability of failure of any one of the "working" OE interfaces. As may be appreciated, because any OE interface can receive optical signals at any channel wavelength, it is not necessary to specifically designate or provision OE interfaces as "working" or "protection". Instead, the control system 36 can control the PXC 34 to couple the appropriate upstream channel 8 to an available OE interface 28 as a "working" interface. If that "working" OE interface subsequently fails, then any other available OE interface 28 can be dynamically selected as the "protection" interface, and the PXC 36 controlled to couple the upstream channel 8 to the newly selected "protection" interface. Simultaneously, the EXC 32 can be controlled to re-map the corresponding electronic signal through the selected "protection" interface, and so restore traffic flow through the communications path 38.

For example, assume that protection and working channels should be provisioned on a 1:1 ratio, based on a probability of failure of a fiber link. In this scenario, the eight upstream channels 8 of FIG. 2 would normally be divided into four input working channels (e.g., in input fiber 20a), and four input protection channels (in fiber 20b). Assume further that "protection" and "working" OE interfaces should ideally be provisioned on a 1:8 ratio, based on the probability of failure of an OE interface. An optimized provisioning of OE interfaces can be achieved by providing five OE interfaces, consisting of four "working" OE interfaces (one for each of the working channels) and one "protection" OE interface. This yields a ratio of 1:4 between protection and working OE interfaces, which more closely matches the ideal 1:8 ratio than would be possible in the prior art network node of FIG. 1.

As shown in FIG. 2, the output side of the EXC 32 follows a pattern that generally mirrors that described above for inbound traffic. In particular, a plurality of Electronic/Optical (EO) interfaces 30 are provided for converting respective outbound electronic signals into corresponding optical signals, which are then coupled through the PXC 34 to a selected output channel 14. In the example of FIG. 2, electrical signal traffic of communications path 38 is mapped through the EXC 32, converted into an optical signal by EO interface EO-1 30a, and then coupled through the PXC 34 to channel 14e of output fiber 22b.

As with the input side of the EXC 32, optimized provisioning of interface resources can be accomplished by suitably selecting the number of EO interfaces 30. In particular, a number of "working" EO interfaces 30 can be provided based on the number of downstream working channels, and one or more "protection" EO interfaces provided based on a probability of failure of any one of the working EO interfaces. This arrangement enables the same optimization of protection to working EO interfaces, independent of the provisioned ratio of protection to working channels, as was described above with respect to the input side of the EXC 32. For example, working and protection downstream channels may be provided in a ratio of 1:1 (i.e., 4 protection channels for 4 working channels), while protection and working EO interfaces can be provided in a ratio of 1:4 (i.e., 1 protection EO interface for 4 working EO interfaces). However, unlike the OE interfaces 28, the working and protection EO interfaces will normally be provisioned in accordance with the design of the network, as described below.

As is well known in the art, each EO interface incorporates a laser that generates the outbound optical signal. As is also known in the art, such a laser can be designed to be tunable over a range of wavelengths. However, it is possible to reduce the cost of an EO interface by restricting the operating range of the laser to a single predetermined wavelength corresponding to (or, more accurately, within a narrow band centered on) the channel wavelength of a selected output channel. Thus the cost of each working EO interface can be reduced by using a narrow-band laser tuned to a selected one of the channel wavelengths of the output channels. In the example of FIG. 2, working EO interfaces EO-1 30a, EO-2 30b and EO-3 30c generate optical signals at wavelengths corresponding to channel wavelengths cw(a), cw(b) and cw(c), respectively. With this arrangement, optical signals can be coupled between a working EO interface and any output channel having the appropriate channel wavelength. Thus the PXC 34 can be controlled to couple optical signals between working EO interface EO-1 30a and either of output channels 14a in fiber 22a or 14e in fiber 22b. Similarly, the PXC 34 can couple optical signals between working EO interface EO-2 30b and either of output channels 14b in fiber 22a or 14f in fiber 22b. The PXC 34 can also couple optical signals between working EO interface EO-3 30c and either of output channels 14c or 14g. As will be appreciated, additional working EO interfaces (not shown) can be provisioned, with appropriately tuned narrowband lasers, as required to provide at least one working EO interface for each working output channel.

Optimized provisioning of output resources involves selecting the number of protection EO interfaces based on a probability of failure of each provisioned working EO interface. In addition, it is also necessary to provide at least one protection interface capable of covering each working interface. This may be accomplished in a variety a ways, which may be used alone or in combination, as desired. For example, one or more protection EO interfaces can be provided with a laser that is designed to be tuned over a range of wavelengths. By suitable selection of respective tuning ranges of each involved protection EO interface, coverage of all of the working channel wavelengths can be provided. With this arrangement, upon detection of a failure of a working EO interface, a protection EO interface can be tuned (e.g., under control of the control system 36) to the wavelength of the failed working EO interface. Thereafter, the EXC 32 can be controlled to re-map the communications path 38 through the involved protection EO interface EO-p 30p (as indicated at 40), and the PXC controlled in a complimentary manner to couple optical signals between the protection interface EO-p 30p and the appropriate downstream channel 14.

An alternative approach is to provide at least one narrow-band protection EO interface for each channel wavelength. This approach is particularly advantageous in embodiments having multiple output fibers, each of which has the same channel plan (i.e., the number and channels, and the respective channel wavelengths). Thus each narrow-band protection EO interface covers one channel of each of the output fibers. With this arrangement, upon detection of a failure of a working EO interface, the control system 36 can select a protection EO interface having the same wavelength as the failed "working" EO interface. Thereafter, the EXC 32 can be controlled to re-map the communications path 38 through the selected protection EO interface EO-p 30p (as indicated at 40), and the PXC controlled in a complimentary manner to couple optical signals between the protection interface EO-p 30p and the appropriate output channel 14.

In the foregoing description, the present invention is described with reference to an exemplary embodiment in which traffic is switched between two upstream and two downstream fiber links. For simplicity of description, the channel plan is the same for each fiber link.

However, it will be appreciated that the present invention can be usefully deployed with virtually any number of fiber links, and any number of channels per fiber. In general, the present invention can provide hybrid photonic/electronic N×M switching, where N and M are the number of input and output channels, respectively. The values of N and M may, or may not be equal, and can be arbitrarily large. For example, known PXC and EXC technology can be utilized to enable N and M values of 1000 or more. Furthermore, it will be understood that the channel plan in any one fiber may be the same, or different, from that of any other fiber.

As described above, the number of working interfaces is selected based on the number of working channels of the network (on the input or output sides of the node, as appropriate). In some cases (e.g., in a BLSR network), these working channels may be statically provisioned in association with provisioned protection channels. However, this is by no means a requirement of the present invention. It will be appreciated that the present invention can equally be employed in mesh networks in which working and protection channels can be dynamically allocated based on respective parameters associated with each channel.

Thus it will be appreciated that the embodiment(s) of the invention described above are intended to be exemplary only. The scope of the invention is therefore intended to be limited solely by the scope of the appended claims.

We claim:

1. A system for hybrid electronic/photonic switching of traffic in a node of a communications network, the system comprising:
   a plurality of interfaces adapted to translate respective traffic streams between corresponding electronic and optical signals, the plurality interfaces comprising:
   at least one working interface; and
   at least one protection interface, a number of the protection interfaces being provisioned based on a probability of failure of a working interface;
   an electronic cross-connect (EXC) adapted to selectively map an electronic signal from a selected first one of the interfaces to a selected second one of the plurality of interfaces;
   a photonic cross-connect (PXC) adapted to selectively couple respective optical signals between each selected interface and selected ones of a plurality of optical channels comprising at least one working optical channel and at least one protection optical channel of the communications network; and
   wherein the traffic streams through the hybrid electronic/photonic switching system can be re-routed to bypass a failed interface without altering traffic flows within the communications network itself, as each of the plurality of interfaces can be selected independently of the at least one working optical channel and the at least one protection optical channel.

2. A system as claimed in claim 1, wherein a number of working interfaces corresponds with a number of working channels of the communications network.

3. A system as claimed in claim 2, wherein each working interface is adapted to translate between an electronic signal and a corresponding optical signal having a substantially fixed predetermined wavelength.

4. A system as claimed in claim 3, wherein the predetermined wavelength is determined during provisioning of the interface in accordance with a design of the communications network.

5. A system as claimed in claim 4, wherein the predetermined wavelength corresponds with a channel wavelength of at least one working channel of the network.

6. A system as claimed in claim 3, wherein at least one working interface comprises a narrow-band laser adapted to generate an optical signal having the predetermined wavelength.

7. A system as claimed in claim 3, wherein at least one working interface comprises a tunable laser adapted to generate an optical signal having the predetermined wavelength.

8. A system as claimed in claim 1, wherein each protection interface is adapted to translate between an electronic signal and a corresponding optical signal having a selected wavelength.

9. A system as claimed in claim 8, wherein the selected wavelength is dynamically selected from a set of channel wavelengths of the network.

10. A system as claimed in claim 8, wherein each protection interface comprises either one or both of:
    a wide-band optical detector adapted to detect an optical signal having a wavelength corresponding to any channel wavelength of the network; and
    a laser adapted to generate an optical signal having the selected wavelength.

11. A system as claimed in claim 10, wherein the laser is a narrow-band laser adapted to generate an optical signal having the selected wavelength.

12. A system as claimed in claim 10, wherein the laser is a tunable laser adapted to generate an optical signal having the predetermined wavelength.

13. A system as claimed in claim 12, wherein the control system comprises:
    a first detector adapted to detect a failure of a working interface;
    a selector adapted to select a protection interface for translating the respective traffic stream of the failed working interface;
    an EXC controller adapted to control the EXC to re-map the respective electronic signal of the traffic stream through the selected protection interface; and
    a PXC controller adapted to control the PXC to couple the respective optical signal of the traffic stream between the selected protection interface and a respective optical channel through which the traffic stream is being conveyed.

14. A system as claimed in claim 13, wherein the control system further comprises a tuner adapted to tune the selected protection interface to the predetermined wavelength of the failed working interface.

15. A system as claimed in claim 12, wherein the control system comprises:
    a second detector adapted to detect a failure of a working channel of the communications network;
    a second selector adapted to select an alternate optical channel through which a traffic stream being conveyed by the failed channel can be carried; and
    a PXC controller adapted to control the PXC to couple the respective optical signal of the traffic stream between the selected interface and the selected alternate optical channel.

* * * * *